(12) United States Patent
Humer

(10) Patent No.: US 6,604,788 B1
(45) Date of Patent: Aug. 12, 2003

(54) VEHICLE PIVOTAL HEADREST

(75) Inventor: Mladen Humer, East Pointe, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/868,197

(22) PCT Filed: Dec. 14, 1999

(86) PCT No.: PCT/US99/29681

§ 371 (c)(1),
(2), (4) Date: Jun. 13, 2001

(87) PCT Pub. No.: WO00/35707

PCT Pub. Date: Jun. 22, 2000

Related U.S. Application Data

(60) Provisional application No. 60/112,099, filed on Dec. 14, 1998.

(51) Int. Cl.[7] .................................................. B60N 2/42
(52) U.S. Cl. .............................. 297/216.13; 297/216.12
(58) Field of Search ........................ 297/216.12, 216.13, 297/216.14, 408, 410

(56) References Cited

U.S. PATENT DOCUMENTS

| | | |
|---|---|---|
| 2,869,622 A | 1/1959 | Petersen et al. |
| 3,008,767 A | 11/1961 | Fox |
| 3,397,911 A | 8/1968 | Brosius, Sr. |
| 3,498,670 A | 3/1970 | Finch et al. |
| 3,680,912 A * | 8/1972 | Matsuura ............ 297/216.12 X |
| 4,082,354 A | 4/1978 | Renner et al. |
| 4,190,291 A | 2/1980 | Korger |
| 4,511,180 A | 4/1985 | Klaus |
| 4,626,028 A | 12/1986 | Hatsutta et al. |
| 4,762,367 A | 8/1988 | Denton |
| 4,822,102 A | 4/1989 | Duvenkamp |
| 5,011,225 A | 4/1991 | Nemoto |
| 5,205,585 A | 4/1993 | Reuber et al. |
| 5,378,043 A | 1/1995 | Viano et al. |
| 5,484,189 A | 1/1996 | Patterson |
| 5,664,841 A | 9/1997 | Dal Monte |
| 5,772,280 A | 6/1998 | Massara |
| 5,795,019 A * | 8/1998 | Wieclawski ............ 297/216.12 |
| 5,823,619 A | 10/1998 | Heilig et al. |
| 5,882,071 A | 3/1999 | Föhl |
| 5,884,968 A | 3/1999 | Massara |
| 5,927,804 A * | 7/1999 | Cuevas .............. 297/216.12 X |
| 5,934,750 A | 8/1999 | Föhl |
| 5,938,279 A | 8/1999 | Schubring et al. |
| 5,961,182 A * | 10/1999 | Dellanno ............... 297/216.12 |
| 6,017,086 A | 1/2000 | Meyer et al. |
| 6,019,424 A | 2/2000 | Rückert et al. |
| 6,022,074 A | 2/2000 | Swedenklef |
| 6,024,406 A | 2/2000 | Charras et al. |
| 6,033,018 A | 3/2000 | Föhl |
| 6,082,817 A | 7/2000 | Müller |
| 6,088,640 A * | 7/2000 | Breed ................. 297/216.12 X |
| 6,213,548 B1 * | 4/2001 | Van Wynsberghe et al. ..... 297/216.1 |

FOREIGN PATENT DOCUMENTS

| | | |
|---|---|---|
| DE | 21 52 202 A | 4/1973 |
| DE | 21 52 437 A | 4/1973 |
| WO | WO 98 09838 A | 3/1998 |
| WO | WO 98 16406 A | 4/1998 |

OTHER PUBLICATIONS

J. Latchford and E.C. Chirwa, "Airbag Head Restraint System", Automotive Engrng, Faculty of Technology, Bolton Institute, UK.

* cited by examiner

Primary Examiner—Anthony D. Barfield
(74) Attorney, Agent, or Firm—Bill Panagos

(57) ABSTRACT

A vehicle seat and headrest arrangement (100) includes a seatback frame (102) and a headrest (104) having a cushion portion (108) and an impact target (113) pivotally associated with the seatback frame (102). A rearward force acting upon the impact target causes the cushion portion to rotate forwardly. A spring (116) operatively associated with the headrest (104) and the seatback frame (102) biases the headrest against pivotal movement. The arrangement further includes a damper (118) operatively associated with the headrest (104) and the seatback frame (102).

18 Claims, 6 Drawing Sheets

VEHICLE PIVOTAL HEADREST

CROSS-REFERENCE TO RELATED APPLICATION

This application is the U.S. national phase of PCT application number PCT/US99/29681, filed Dec. 14, 1999, which further claims the benefit of U.S. provisional application Ser. No. 60/112,099, filed Dec. 14, 1998.

TECHNICAL FIELD

This invention relates to seat headrest arrangements and methods of utilization thereof.

BACKGROUND ART

Headrests are known in the vehicle seating art. Examples of vehicle seat headrests are disclosed in U.S. Pat. No. 4,822,102 issued to Duvenkamp, U.S. Pat. No. 4,762,367 issued to Denton, International Application Number PCT/SE97/01487 (International Publication Number WO 98/09838), and International Application Number PCT/NO97/00271 (International Publication Number WO 98/16406). The present invention provides a vehicle seat headrest arrangement which provides an alternative to the aforementioned patents with special unique advantages to be explained later herein.

DISCLOSURE OF INVENTION

Under the invention, a vehicle seat and headrest arrangement includes a seatback frame and a headrest having a cushion portion and an impact target pivotally associated with the seatback frame. A rearward force acting upon the impact target causes the cushion portion to rotate forwardly. A spring operatively associated with he headrest and the seatback frame biases the headrest against pivotal movement. The arrangement further includes a damper operatively associated with the headrest and the seatback frame.

With such an arrangement, the damper retards return movement of the headrest caused by the spring. Advantageously, the damper significantly decrease back driving of the cushion portion that may be caused by the head of an occupant during a rear collision.

According to a feature of the invention, the spring and the damper may be coaxially aligned with each other. Furthermore, the cushion portion may be configured to absorb energy.

These and other objects, features and advantages of the present invention are more readily apparent from the following detailed description of the best modes for carrying out the invention when taken in conjunction with the accompanying drawings.

BEST MODES FOR CARRYING OUT THE INVENTION

The present invention is an improvement to the invention disclosed in U.S. Pat. No. 5,378,043, which issued to Viano et al. The invention of Viano et al. '043 relates to a vehicle seat and headrest arrangement, which is described below in greater detail.

Figure 1:
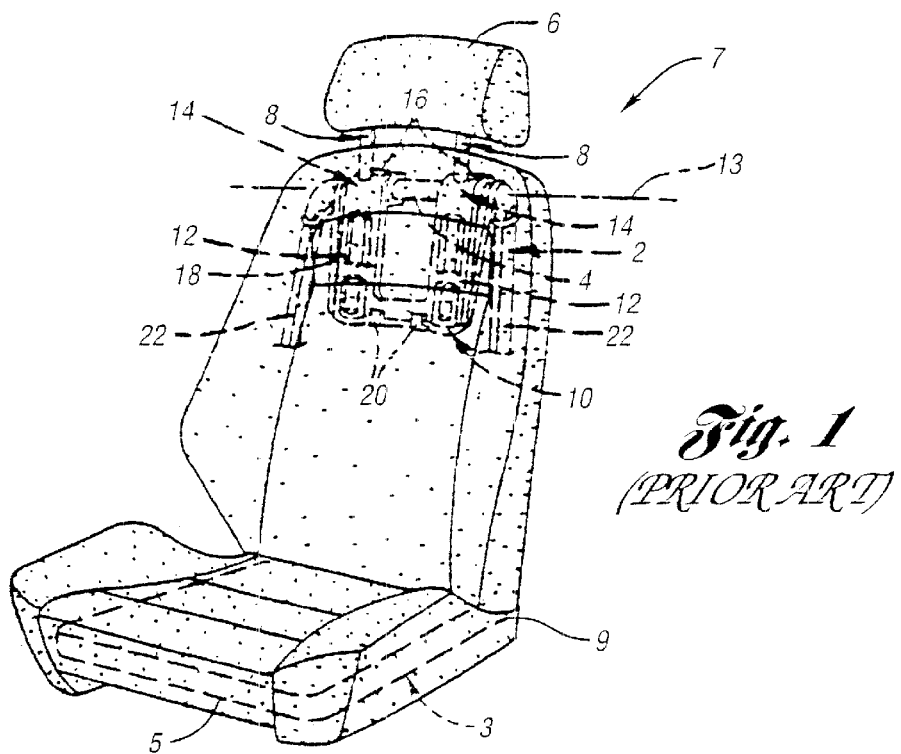
FIG. 1 is a perspective view of a vehicle seat and headrest arrangement according to the invention disclosed in U.S. Pat. No. 5,378,043.

Referring to FIG. 1 of Viano et al. '043, the vehicle seat and headrest arrangement 7 has a seat bun frame 3. The seat bun frame 3 has fore 5 and 9 ends generally positionally aligned with the fore and aft segments of the vehicle in which the seat and headrest arrangements 7 is placed. Joined to the seat bun frame 3 generally adjacent its aft end 9 is a seatback frame 2. The seatback frame 2 is generally in the shape of an inverted U having two risers or sides 22 joined by a cross frame member 4. Typically, the seat bun and back frames 3, 2 will be made from steel, metallic or other structural members.

Providing a surface for contact with the head of a vehicle seat occupant is a headrest cushion 6. The headrest cushion 6 has extending therefrom two posts 8. An impact target or plate 10 is pivotally mounted to the cross member 4 along a fixed pivotal axis 13 generally perpendicular to the fore and aft direction of the vehicle. The plate 10 has two formed alignment members 12 for each respective post 8 for mounting of the headrest cushion 6 to the seatback frame 2. The headrest posts 8 are adjustable vertically with respect to the plate 10 in a manner conventional for that of vehicle seat headrests.

The plate 10 mentioned previously is pivotally mounted with respect to the cross member 4 by virtue of its clamped ends 14. The clamped ends 14 are joined to the cross member 4 by the use of a metal clip 16 which has flanges 26 that pop into apertures 15 (only one shown) of the clamped end 14. To stabilize the headrest cushion 6 in position and to prevent its rotation except at a threshold amount of force, there is a spring 18 which wraps around the intersection of the risers 22 with the cross member 4. The spring 18 extends downwardly and is held to the plate 10 by clips 20. Rearward loading of the plate 10 will cause the headrest cushion 6 to pivot toward the head of a seat occupant. The loading required for pivotal movement of the headrest cushion 6 can be set to occur only during an instance where a vehicle seat occupant is seated in the seat and the vehicle undergoes acceleration due to a rear impact-type situation.

Figure 3:
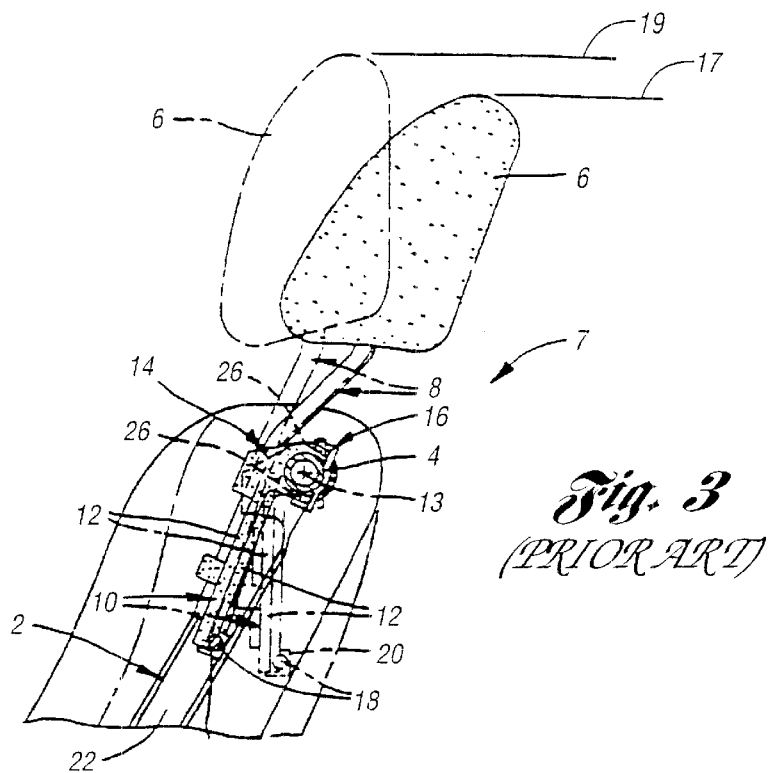
FIG. 3 is a side view illustrating operation of the headrest shown in FIG. 2.

Alternatively, the spring 18 can be configured or sized to be easily movable at lower pressure levels and then plastically deform under predetermined loads representative of a rear impact-type situation. The pivoting of the headrest cushion 6 forwardly also has a beneficial effect of raising the relative height of the headrest 6 with respect to the seat bun frame from a height of 17 to 19 as shown in FIG. 3.

Figure 2:
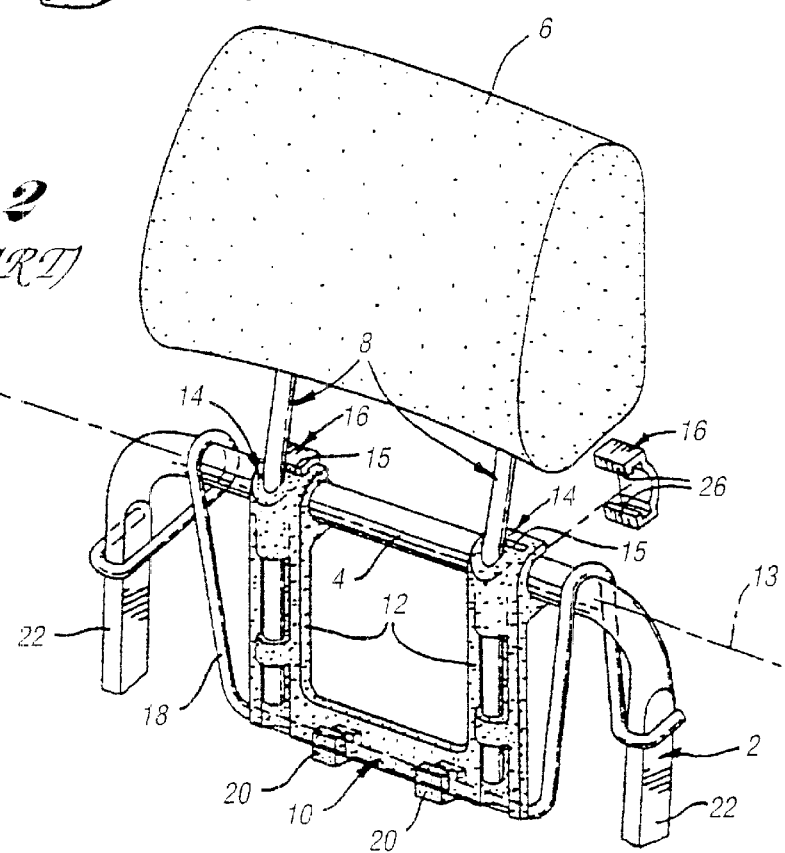
FIG. 2 is an enlarged view of the headrest shown in FIG. 1 with portions of a seatback cushion removed for clarity of illustration.
Figure 4:
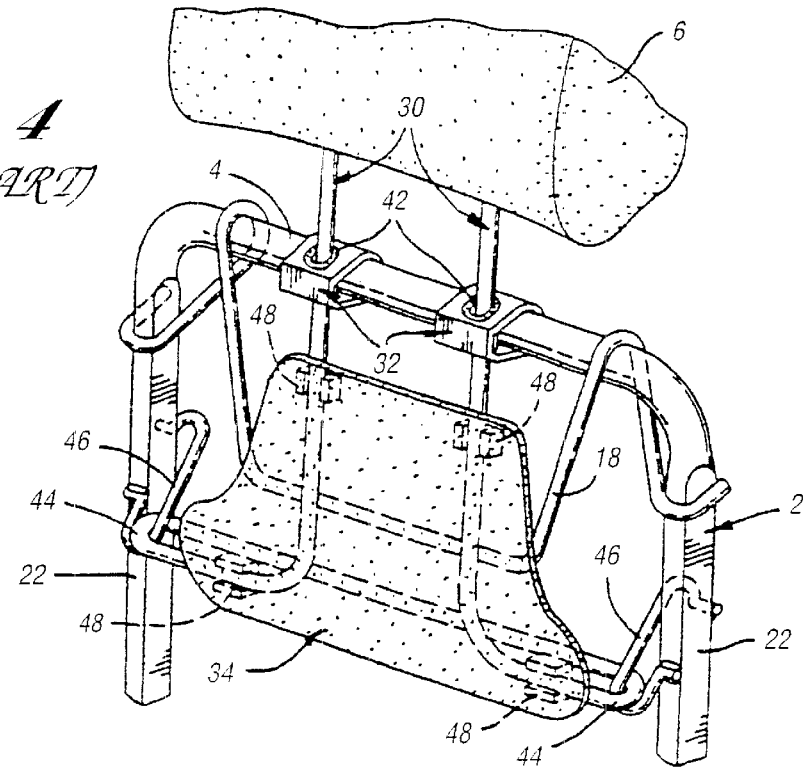
FIG. 4 is a perspective view of an alternate embodiment of the vehicle seat and headrest arrangement of U.S. Pat. No. 5,378,043.
Figure 5:
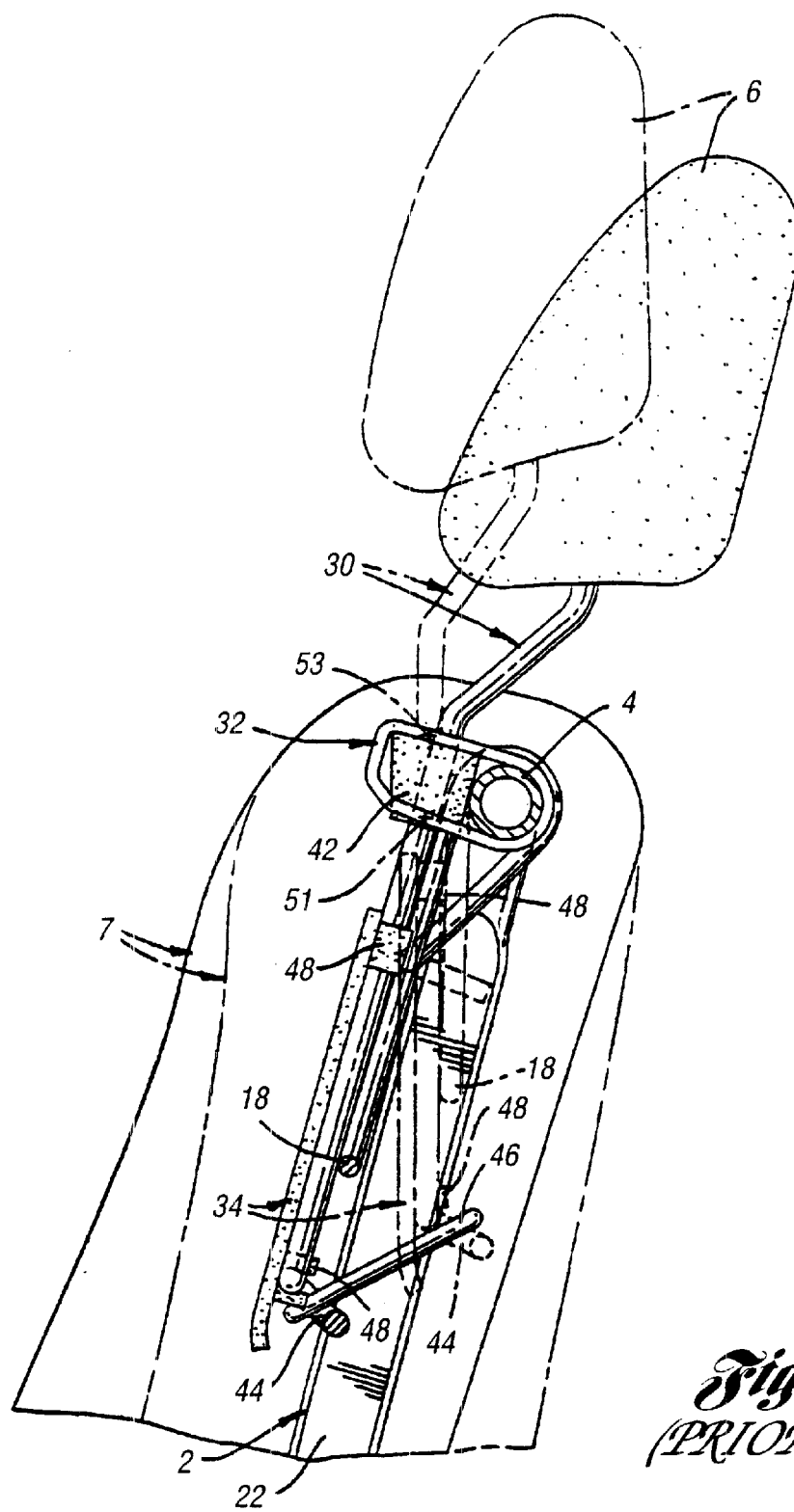
FIG. 5 is a side view illustrating operation of the headrest shown in FIG. 4.

Referring additionally to FIGS. 4 and 5, an alternate embodiment of the invention of Viano et al. '043 is brought forth with similar items providing the same function given like numerals as that shown in FIGS. 1 through 3. In FIG. 4, the posts 30 are held to the cross member 4 by penetration through an elastomeric bushing 42, which is mounted in a clip 32 that is fitted on the cross member 4. The posts 30 additionally extend downwardly, having loop sections 44 that are directed by two angular cam guides 46, which have a generally downward slope projecting generally forwardly. The impact plate 34 is attached with the posts 30 by four clips 48. A spring 18 biases the headrest cushion 6 against rotation by contact with the posts 30.

A force placed upon the plate 34 causes the posts 30 to have a variable axis of rotation with respect to the cross member 4, since the cam guides 46 will cause the posts 30 to rise upwardly after a sufficient force has been imparted to the plate 34. Also, the interaction of loop sections 44 with the cam guides 46 will cause the headrest cushion 6 to be rotated slightly fowardly (FIG. 5).

Upon a sufficient push on the plate 34, the posts 30 have an axis of rotation noted as 51. On a rear impact of sufficient magnitude, the posts 30 will be translated upward with respect to the clips 32, placing the headrest cushions 6 in a higher and more forward position. The axis of rotation 51 will be constant with respect to the clips 32. However, the projection of the axis of rotation on the posts 30 at the initial impact will be translated to point 53 due to the extending upward motion of the posts 30. Therefore, the axis of rotation of the posts 30 with respect to the cross member 4 is nonfixed with respect to the posts 30.

In normal vehicle seat and headrest arrangements, during the initial stages of a rear impact, the occupant's torso is in contact with the seatback but the head is several inches forward of the headrest. This condition is consistent with the body being reclined at about 20 degrees from vertical with the neck being approximately vertical. In contrast, the seat is usually at a reclined angle of approximately 25 degrees from vertical, and the headrest either follows the contour of the seatback or curves slightly forward. However, for seating comfort, the head is usually not in contact with the headrest while driving. As the occupant loads the seatback in a rear impact, force builds up behind the torso and buttocks of the seat occupant. Depending upon the compliance of the seatback, the occupant compresses into the cushion, but the head, neck and torso move in unison. Typically, there is a greater compression in the buttocks region of the seat occupant, with a gradual reduction up to the shoulder level as the body remains upright. The more sever the crash, the greater the compression of the occupant into the seatback. As this action is occurring, the initial load of the occupant attempts to deflect the seatback rearwardly. The amount of deflection is related to the bending stiffness of the seatback. However, the seatback may possibly deflect under the torso load prior to the head and neck of the occupant contacting the headrest. Therefore, in a conventional seat, there may exist a gap between the head and headrest in the crash situation. In the invention of Viano et al. '043, the force of the occupant's torso being cast into the seat causes the impact plate 34 or 10 to cause the headrest cushion 6 to rotate toward the vehicle occupant. The greater the rear crash acceleration, the greater the resultant force on the seat occupant and the greater the forward rotation and outward movement of headrest 6. An additional advantage is found in the embodiment shown in FIGS. 4 and 5 in that the headrest cushion 6 and posts 30 move upwardly, thereby increasing the relative height or outward position of the headrest cushion 6 with respect to the seat occupant's head and minimizing any possible gap between the head and the headrest cushion 6. The above action of the headrest cushion 6 provides a more idealized condition for taller seat occupants.

Figure 6:
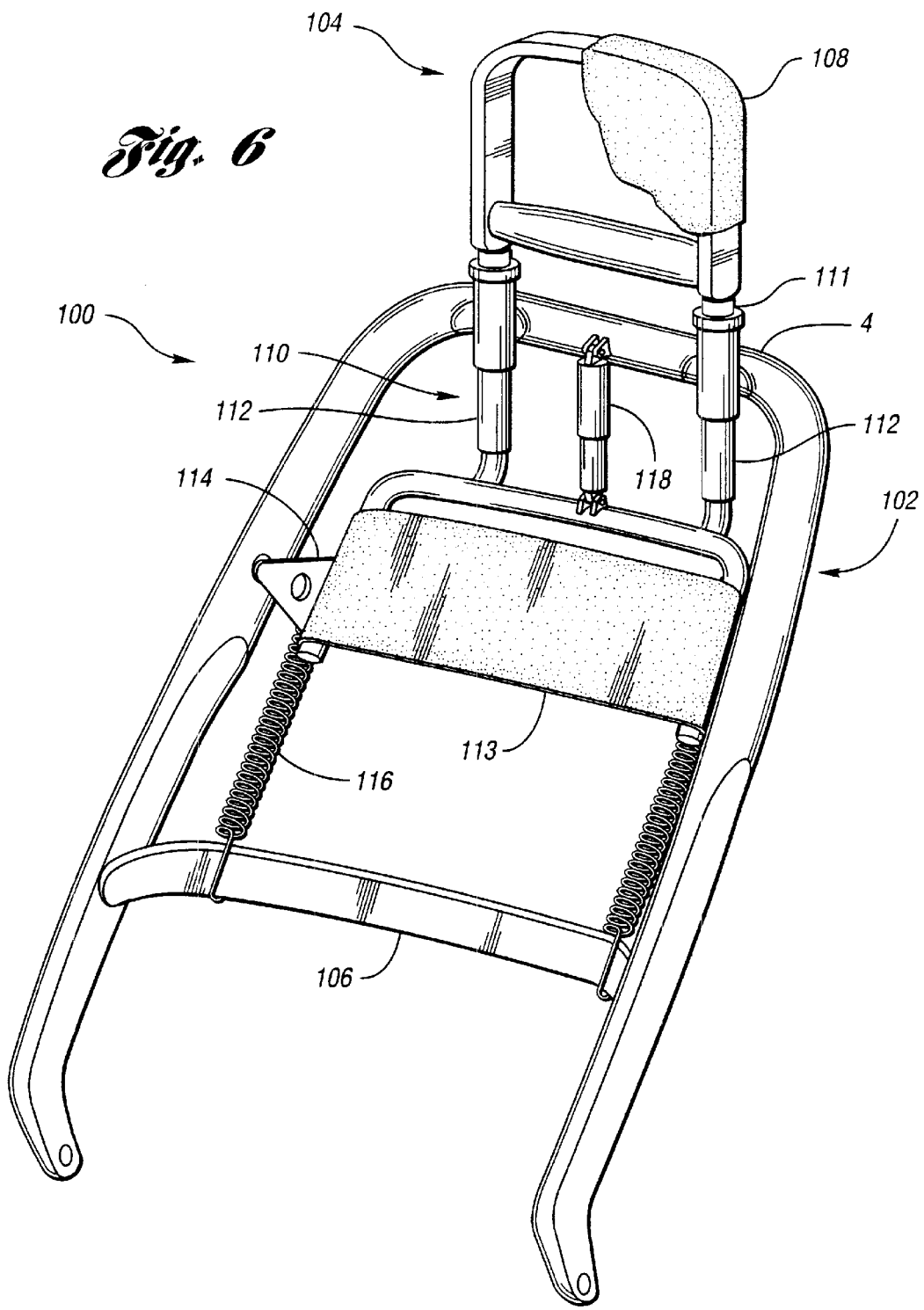
FIG. 6 is a schematic view of a vehicle seat and headrest arrangement according to the present invention and including a single damper connected between the headrest and a seatback frame of the vehicle seat.

Referring to FIG. 6, the present invention will now be described. A vehicle seat and headrest arrangement 100 according to the present invention includes a seatback frame 102 and a headrest 104 movably connected to the seatback frame 102. The seatback frame 102 is similar to the seatback frame 22, and includes a lower cross member 106 in addition to the cross member 4.

Figure 10:
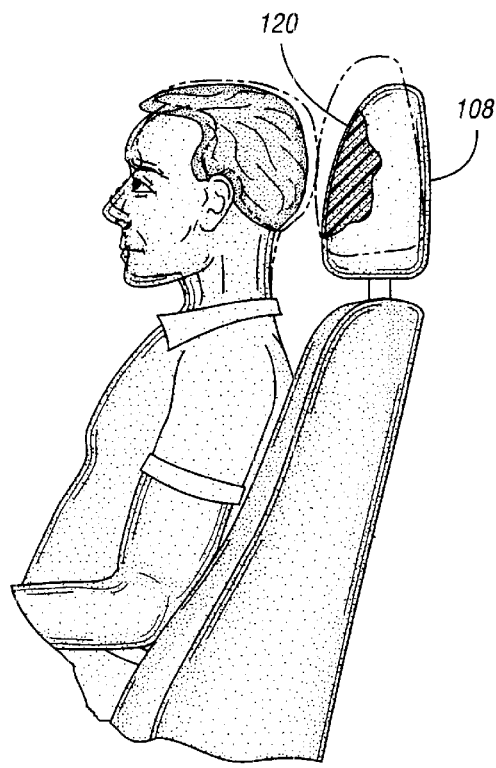
FIG. 10 is a schematic side view of the arrangement shown in FIG. 6 and showing a headrest cushion of the headrest moved forwardly and contacting the head of an occupant.

The headrest 104 includes a headrest cushion 108 and an armature 110 for supporting the headrest cushion 108. The armature 110 includes posts 111 that are connected to risers 112, which are moveably connected to the cross member 4. The armature 110 further includes a target 113 that is pivotably connected to the seatback frame 102 with links 114. The target 113 is configured to receive a load from a seat occupant, and may comprise any suitable material, such as a flexible, semi-flexible or rigid material. Sufficient rearward loading of the target 113, such as during a rear collision, will cause the headrest cushion 108 to pivot upwardly and forwardly toward the head of the seat occupant, as shown in FIG. 10.

Returning to FIG. 6, the vehicle seat and headrest arrangement 100 further includes a pair of springs 116 connected between the headrest 104 and the cross member 106, and a damper 118 connected between the headrest 104 and the cross member 4. Similar to the springs 18 of the vehicle seat and headrest arrangement of Viano et al. '043, the springs 116 bias the headrest cushion 108 against rotation.

The damper 118 exerts a damping force on the headrest 104. The damping force of the damper 118 is low as the armature 110 is actuated, and much higher as the armature 110 returns. The headrest cushion 108 can be easily moved forwardly by hand. If the headrest cushion 108 is then abruptly released, the damper 118 slows down movement so that the headrest cushion 108 comes to rest with a softer noise compared with an arrangement provided without a damper. Thus, the damper 118 retards the return speed of the headrest cushion 108 and the armature 110.

In certain cases during a rear collision, the chest of the occupant might reach peak acceleration significantly before the peak of the head acceleration. As an example, the chest may begin its rebound just as the head is reaching its peak. Consequently, the chest force might not be high enough to support the head, which might cause the head to push the headrest cushion 108 and the armature 110 rearwardly. The damper 118 significantly decreases this "back driving," improving the support for the head and reducing the load on the neck.

Figure 7:
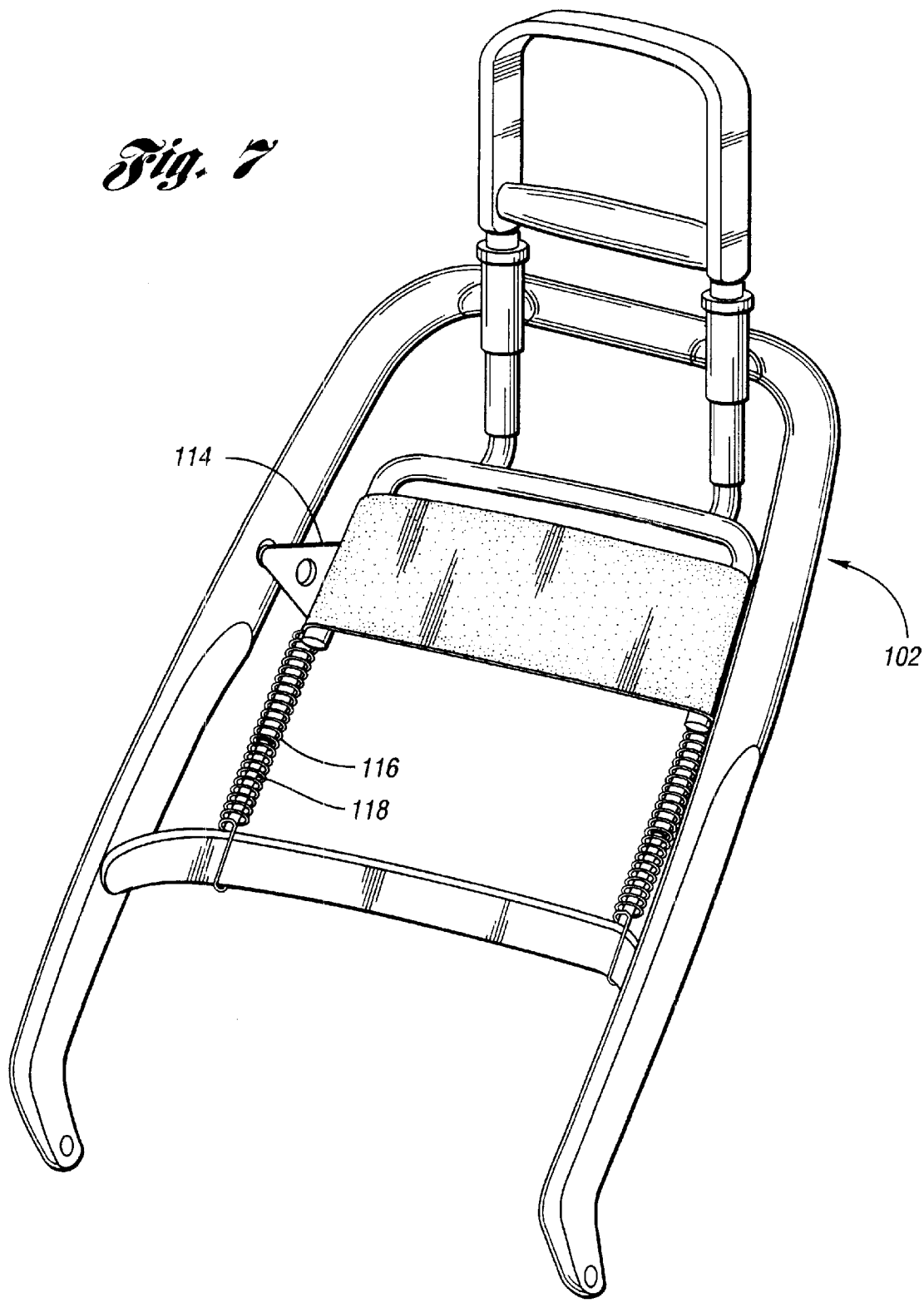
FIG. 7 is an alternative embodiment of the vehicle seat and headrest arrangement of the present invention including two dampers connected between the headrest and the seatback frame, wherein the dampers are coaxially aligned with a pair of springs.
Figure 8:
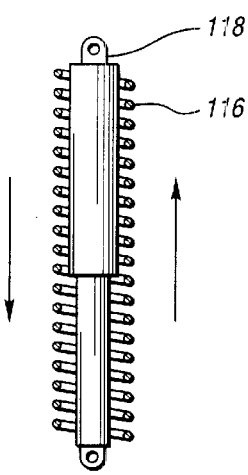
FIG. 8 is a front view of one of the dampers and one of the springs shown in FIG. 7.

A single damper 118 may be placed between the seatback frame 102 and armature 110, as shown in FIG. 6. Alternatively, as shown in FIGS. 7 and 8, two dampers 118 may be placed coaxially with the return springs 116 and connected to the frame 102 and the links 114.

The dampers 118 may be pneumatic or hydraulic units. Pneumatic devices may be more desirable, however, for several reasons: (1) air has less variation in damping force due to temperature than hydraulic fluid, (2) minor leakage is not a problem and (3) a pneumatic unit is likely to be lower cost than a hydraulic unit.

Figure 9:
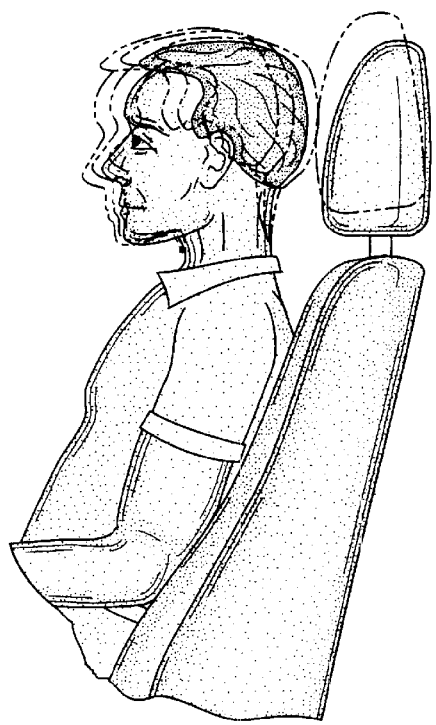
FIG. 9 is a schematic side view of the arrangement shown in FIG. 6 including an occupant.

FIG. 10 shows the headrest cushion 108, which is preferably configured to absorb energy. The basic principle is to improve the Saab SAHR headrest by providing some energy absorption to cause more even and controlled contact with the head during impact. This leads to quicker head support. Without such energy absorption, the head tends to oscillate after impacting a headrest cushion as shown in FIG. 9.

Figure 11:
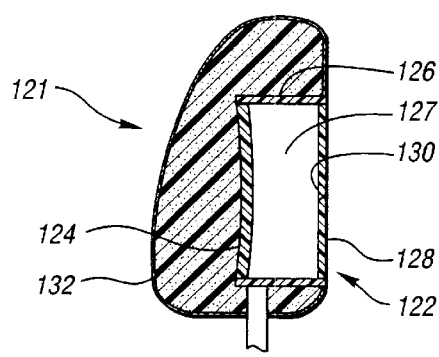
FIG. 11 is a schematic view of an alternate embodiment of the headrest cushion of the headrest.

Returning to FIG. 10, the headrest cushion 108 may include energy absorbing foam 120 that is configured to dampen movement of the head of the occupant as the head contacts the headrest cushion 108. Alternatively, as shown in FIG. 11, a headrest cushion 121 may be provided with a mechanical system 122 that provides both springing and damping effects. The system 122 includes a flexible membrane 124 attached to a housing 126, which defines a chamber 127. The housing includes a rear member or plate 128 having a metered opening or hole 130, which allows the chamber 127 to be in fluid communication with the atmosphere. The metered hole 130 may also be defined by a flow control valve attached to the housing 126. The system 122 may also include a cover layer 132, which may include foam or other cushioning material, for providing a pleasing aesthetic appearance and for contacting the head of the occupant.

The membrane 124 may comprise any suitable material such as an elastic polymer, and is configured to flex into the chamber 127 when the head of the occupant exerts a rearward force on the headrest cushion 121, such as in a rear collision. The metered hole 130 is configured to allow air to easily exit the chamber 127, while restricting air flow back into the chamber 127 as the rearward force on the headrest cushion 121 diminishes. With such an arrangement, movement of the membrane 124 back to a rest position will be retarded. Consequently, head oscillation during impact or collision events is significantly reduced.

While embodiments of the invention have been illustrated and described, it is not intended that these embodiments illustrate and describe all possible forms of the invention. Rather, the words used in the specification are words of description rather than limitation, and it is understood that various changes may be made without departing from the and scope of the invention.

What is claimed is:

1. A vehicle seat and headrest arrangement (100) comprising a seatback frame (102); a headrest (104) having a cushion portion (108) and an impact target (113) pivotally associated with the seatback frame (102), wherein a rearward force upon the impact target (113) causes the cushion portion (108) to rotate forwardly; and a spring (116) operatively associated with the headrest (104) and the seatback frame (102) for biasing the cushion portion (108) against forward rotation; characterized by:
   a damper (118) connected between the impact target (112) and the seatback frame (102) for retarding rearward rotation of the cushion portion (108), wherein the damper (118) is coaxially aligned with the spring (116).

2. The arrangement (100) of claim 1 wherein the damper (118) is disposed beneath the cushion portion (108).

3. The arrangement (100) of claim 1 wherein the damper (118) is disposed within the spring (116).

4. The arrangement (100) of claim 1 wherein the damper (118) is a pneumatic damper.

5. The arrangement (100) of claim 1 wherein the damper (118) is a hydraulic damper.

6. The arrangement (100) of claim 1 wherein the cushion portion (108) of the headrest (104) includes energy absorbing foam.

7. The arrangement (100) of claim 1 wherein the cushion portion (108) of the headrest (104) includes a membrane (124) adjacent a chamber (127) that is in fluid communication with the atmosphere.

8. The arrangement (100) of claim 7 wherein the membrane (124) is configured to flex into the chamber (127) when a rearward force is exerted on the membrane (124), so as to cause air to exit the chamber (127).

9. The arrangement (100) of claim 1 wherein the cushion portion (108) of the headrest (104) includes a flexible membrane (124) attached to a housing (126) that defines a chamber (127), the housing (126) including an opening (130) for allowing air to pass from the chamber (127) when a rearward force is exerted on the membrane (124).

10. The arrangement (100) of claim 9 wherein the opening (130) is configured to restrict air flow back into the chamber (127) as the rearward force on the membrane (124) diminishes.

11. The arrangement (100) of claim 1 further including an additional spring (116) operatively associated with the headrest (104) and the seatback frame (102) for biasing the cushion portion (108) against forward rotation, and an additional damper (118) connected between the impact target (113) and the seatback frame (102) for retarding reward rotation of the cushion portion (108), wherein the additional spring (116) and the additional damper (118) are coaxially aligned.

12. The arrangement (100) of claim 11 wherein the damper (118) is disposed within the spring (116), and the additional damper (118) is disposed within the additional spring (116).

13. A vehicle seat and headrest arrangement (100) for use with a vehicle and comprising a seatback frame (102); a headrest (104) having a cushion portion (108) and a target (113) moveably associated with the seatback frame (102), wherein rearward loading of the target (113) causes the cushion portion (108) to move forwardly; and a pair of springs (116) operatively associated with the target (113) and the seatback frame (102) for moving the cushion portion (108) rearwardly after the cushion portion (108) has moved forwardly; characterized by:
   a pair of dampers (118) operatively associated with the target (113) and the seatback frame (102) for retarding rearward movement of the cushion portion (108) after the cushion portion (108) has moved forwardly, wherein each damper (118) is disposed within and coaxially aligned with a particular spring (116).

14. The arrangement (100) of claim 13 wherein one end of each spring (116) is attached to the seat back frame (102).

15. The arrangement (100) of claim 13 wherein each spring (116) extends radially beyond the outermost surface of the particular damper (118).

16. The arrangement (100) of claim 1 wherein the damper (118) is configured to retard reward rotation of the cushion portion (108) after the cushion portion (108) has moved forwardly.

17. The arrangement (100) of claim 1 wherein one end of the spring (116) is attached to the seat back frame (102).

18. The arrangement (100) of claim 1 wherein the spring (116) extends radially beyond the outermost surface of the damper (118).

* * * * *